United States Patent [19]

Ramun

[11] Patent Number: 5,386,652
[45] Date of Patent: Feb. 7, 1995

[54] CYLINDER GUARD

[75] Inventor: John Ramun, Youngstown, Ohio

[73] Assignee: Allied Gator, Inc., Youngstown, Ohio

[21] Appl. No.: 151,299

[22] Filed: Nov. 12, 1993

[51] Int. Cl.⁶ .............................................. E02F 9/24
[52] U.S. Cl. ...................................... 37/406; 137/190; 137/231; 74/615; 172/813; 414/718
[58] Field of Search ................... 92/165 R, 167; 37/8, 37/129, 406; 172/813; 74/615; 212/189; 414/685, 722, 517, 718, 510

[56] References Cited

U.S. PATENT DOCUMENTS

| | | | |
|---|---|---|---|
| 4,167,826 | 9/1979 | Feliz | 37/190 |
| 4,234,130 | 11/1980 | Trott et al. | 414/510 X |
| 4,264,265 | 4/1981 | Stoychoff | 414/718 |
| 4,744,159 | 5/1988 | Houle | 37/231 |
| 4,936,193 | 6/1990 | Stoll | 92/51 |
| 4,949,593 | 8/1990 | Vignoli et al. | 74/615 X |
| 5,074,390 | 12/1991 | Fuhrmann et al. | 188/322 |
| 5,152,351 | 10/1992 | Rieger | 172/813 |

Primary Examiner—Dennis L. Taylor
Assistant Examiner—Robert Pezzuto
Attorney, Agent, or Firm—Harpman & Harpman

[57] ABSTRACT

A cylinder and piston rod guard attachment for a backhoe or the like. The cylinder and piston rod guard is arranged to extend over the cylinder housing and the associated piston rod as it extends therefrom to protect the extended piston rod. A U-shaped inverted channel sleeve configuration extends from the attached end of the piston rod and is supported in sliding spaced relation above the cylinder housing by support tracks secured to the cylinder housing. As the rod advances out of the cylinder housing, the cylinder guard extends therewith protecting same.

7 Claims, 4 Drawing Sheets

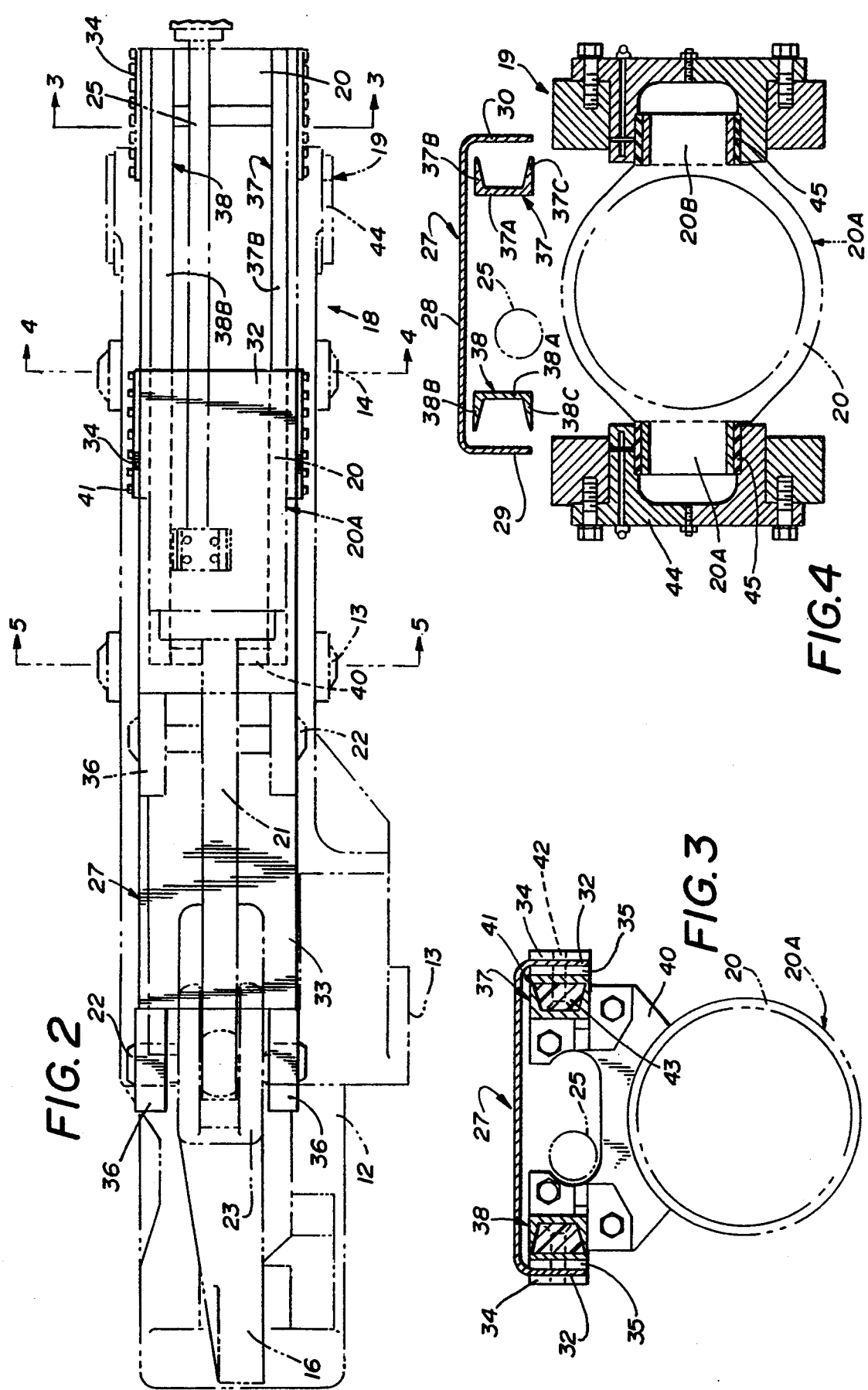

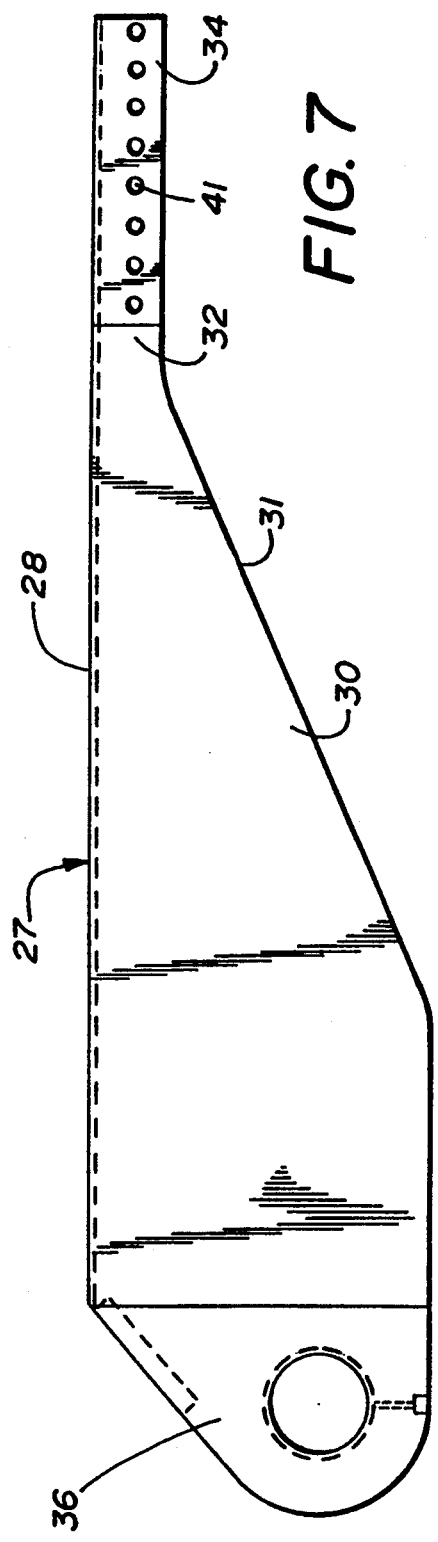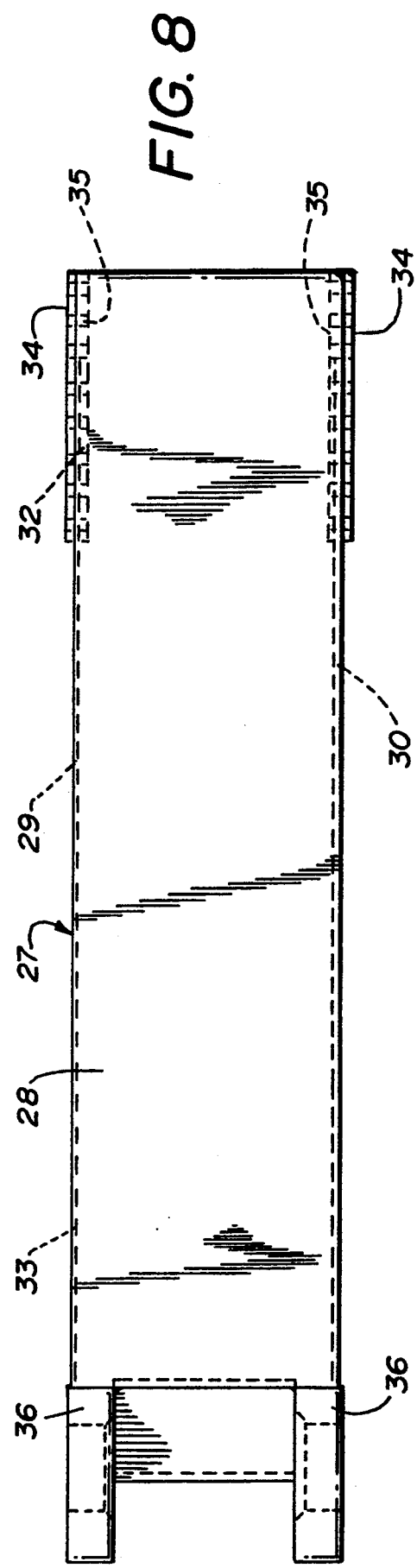

CYLINDER GUARD

BACKGROUND OF THE INVENTION

1. Technical Field

This invention relates to attachments for backhoes as commonly used in industry utilizing exposed hydraulic piston and cylinders to activate same particularly with metal cutting shears used in dismantling industrial buildings.

2. Description of Prior Art

Prior art devices of this type have relied on a number of different approaches in attempting to provide a self-contained strong extensible cover for the exposed piston rods of hydraulic cylinders, see for example U.S. Pat. Nos. 4,936,193, 5,074,390 and 5,152,351.

In U.S. Pat. No. 4,936,193 a protective device is disclosed that uses a plurality of telescopically extensible cylinder sleeves extending from the hydraulic cylinder to the end of the piston rod. The tubular sections are interconnected to one another by guide bushings.

U.S. Pat. No. 5,074,390 discloses a cylinder piston device in which a tubular protection surrounds the end portion of the cylinder and extends outwardly encircling the piston rod. This device is directed to provide an air space around the rod and is supported by spaced holding disks on the piston rod.

U.S. Pat. No. 5,152,351 describes a protective arrangement for a piston rod of a hydraulic cylinder defining a shell like sleeve supported by a stationary slide ring on the cylinder housing. The slide ring has tangential slopes on its circumference which render the ring flexible and reduce the friction between the protective sleeve and the sliding ring. The sleeve is secured to a holder that extends from a leg of the housing lug of the piston rod.

SUMMARY OF THE INVENTION

A cylinder and piston rod guard adapted to extend over and between the cylinder housing and the exposed piston rod as it extends therefrom. The cylinder and piston rod guard is supported in spaced vertical relation to the cylinder housing on support and guide tracks providing a secure continuous support as the guard extends outwardly over the piston rod. By providing continuous spaced supporting guide tracks for registering reinforced guide blocks on the guard, a strong self-supporting movable protective structure is possible without interfering with the cylinder and piston rod's performance in hostile environments.

DESCRIPTION OF THE DRAWING

FIG. 2 is a top plan view of the hydraulic cylinder and shear shown in broken lines with the invention;

FIG. 3 is a cross-sectional view on lines 3—3 of FIG. 2;

FIG. 4 is a cross-sectional view on lines 4—4 of FIG. 2;

FIG. 7 is a side plan view of the cylinder guard of the invention; and

FIG. 8 is a top plan view of the cylinder guard of the invention.

DESCRIPTION OF THE PREFERRED EMBODIMENT

Figure 1:
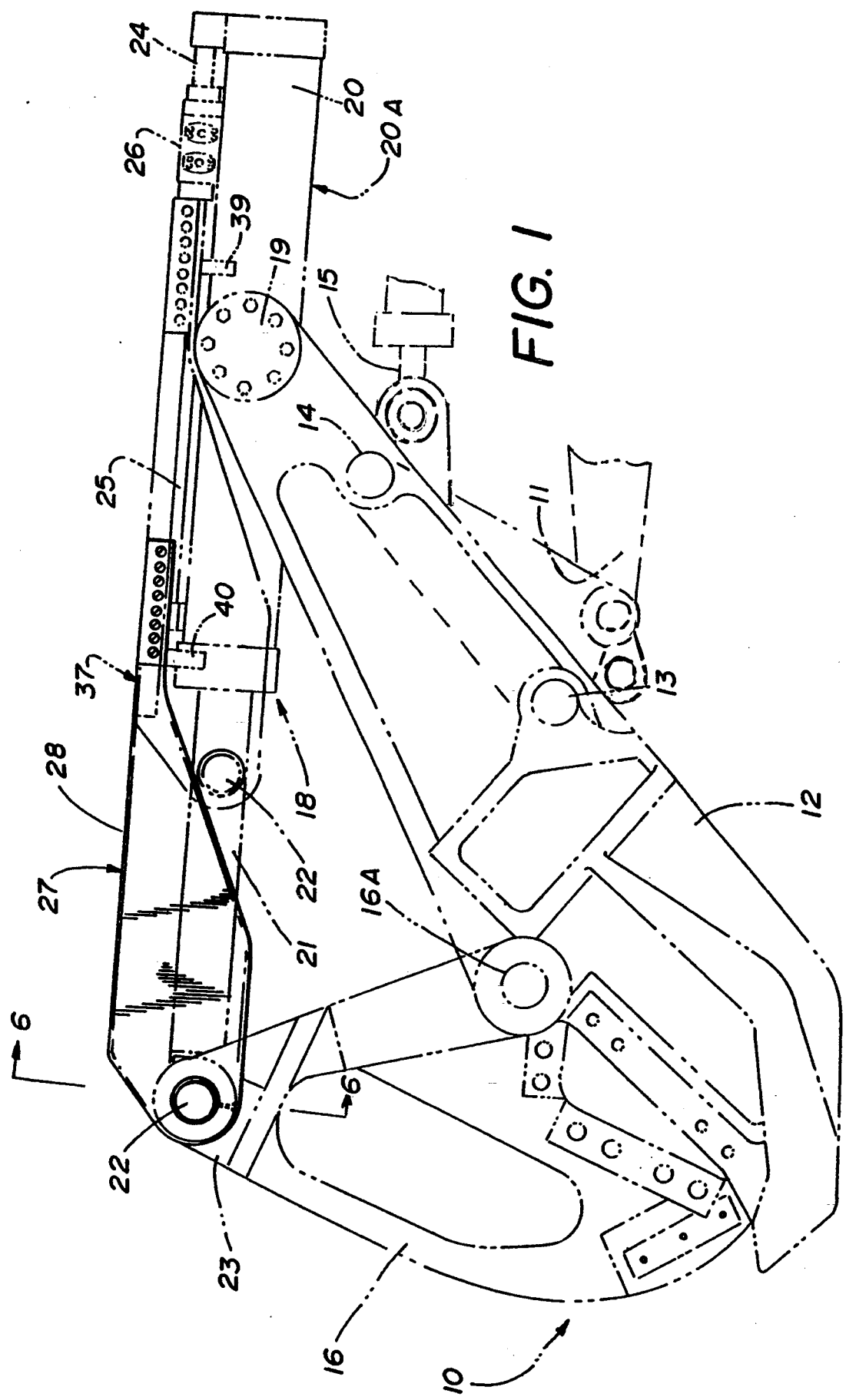
FIG. 1 is a side plan view of a hydraulic cylinder on a backhoe equipped with a shear with the invention thereon.

Referring to FIG. 1 of the drawings, a backhoe shear attachment 10 can be seen mounted on a backhoe boom 11 shown in broken lines. The shear attachment 10 has a fixed blade 12 with a mounting bushing 13 engageable on the end of the backhoe boom 11. A secondary bushing 14 on the fixed blade 12 engages a backhoe piston rod 15 as will be well known and understood by those skilled in the art. A movable opposing shear blade 16 is pivotally secured to the fixed blade 12 at 16A. The movable shear blade 16 is pivotally connected to a hydraulic piston and cylinder assembly 18 which is pivotally mounted on a bifurcated bearing assembly 19 on the fixed blade 12.

The piston and cylinder assembly 18 has a hydraulic cylinder 20A having a cylinder housing 20 from which a piston rod 21 extends. The piston rod 21 is pivotally connected by a pivot pin 22 to a bifurcated end 23 of the movable shear blade 16. Fluid supply tubes 24 and 25 respectively connect with the opposite ends of the hydraulic cylinder 20A with a central fluid supply valve fitting 26 selectively directing hydraulic fluid (not shown) to said cylinder 20A.

Referring to FIGS. 1, 2, 7 and 8 of the drawings, a hydraulic piston rod and cylinder guard 27 of the invention can be seen having a generally rectangular top portion 28 with interconnected oppositely disposed parallel depending sidewalls 29 and 30 extending therefrom. Each of said sidewalls 29 and 30 is tapered longitudinally at 31 defining an apertured guide portion 32 and a rod engagement portion 33. The guide portions 32 have pairs of apertured aligned reinforcing plates 34 and 35 thereon extending inwardly from its respected free end. The rod engagement portion 33 has a pair of transversely spaced mounting bushings 36 extending therefrom for registration with said pivot pin 22 and the piston rod 21.

Figure 5:
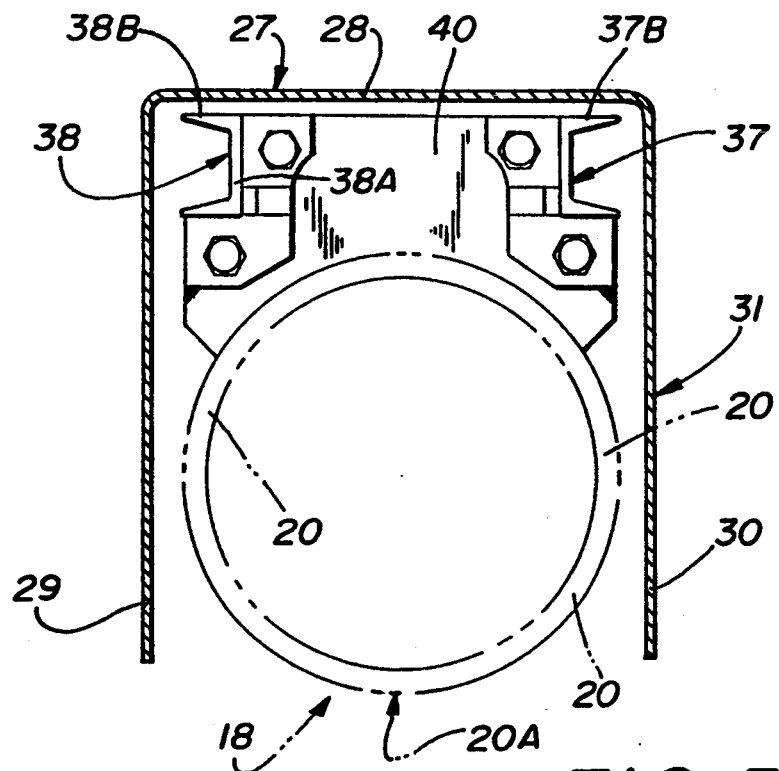
FIG. 5 is a cross-sectional view on lines 5—5 of FIG. 2.
Figure 6:
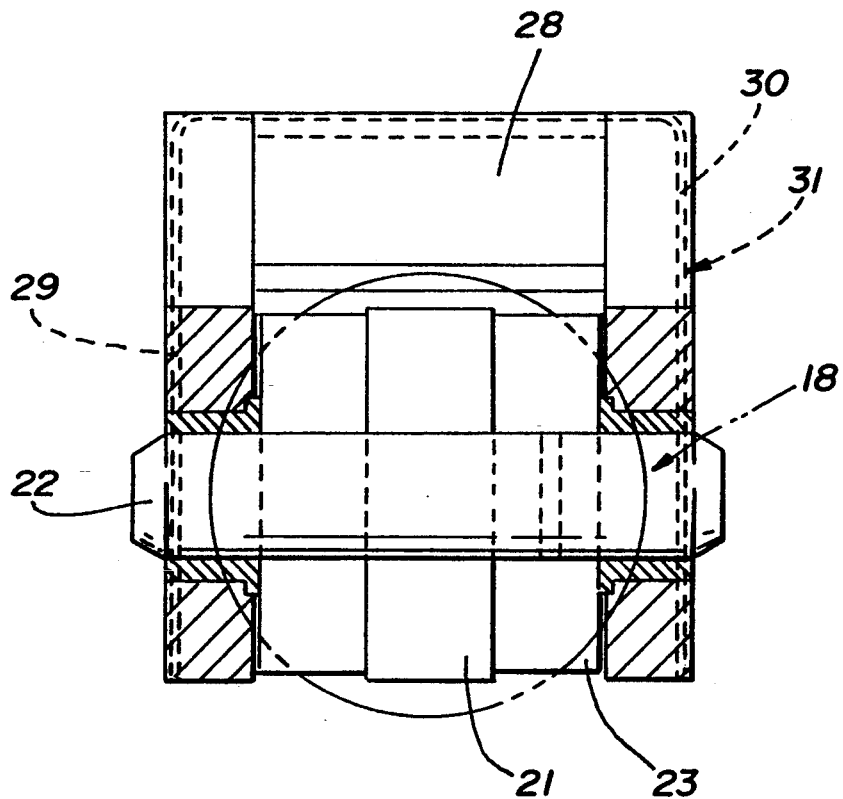
FIG. 6 is a cross-sectional view on lines 6—6 of FIG. 1.

Referring now to FIGS. 1, 3, 4, and 5 of the drawings, horizontally spaced parallel guide channels 37 and 38 can be seen secured in spaced vertical relation to said cylinder housing 20 by a pair of mounting brackets 39 and 40, best seen in FIGS. 3, 4, and 5. Each of said mounting brackets 39 and 40 is secured directly to the upper exterior surface of the cylinder housing 20 adjacent said respective guide portions 32 and rod engagement portion 33 as hereinbefore described. The guide channels 37 and 38 are cross-sectionally U-shaped having respective single upstanding sidewalls 37A and 38A and integral spaced top and bottom tapered walls 37B, 37C and 38B and 38C respectively.

Referring back to FIGS. 2 and 3 of the drawings, multiple guide shoe elements 41 can be seen extending through and securing said respective pairs of apertured aligned reinforcing plates 34 and 35 to said apertured guide guard portion 32 of said sidewalls 29 and 30. Each guide shoe element 41 is comprised of a threaded bolt 42 with a contoured synthetic resin pad 43 on its free end which is registerable within the respective guide channels 37 and 38 supporting the piston and cylinder guard 27 in spaced aligned movable position on said piston and cylinder assembly 18 as seen in FIGS. 3–5 of the drawings.

Referring now to FIG. 4, the bearing assembly 19 can be seen in detail indicated in solid lines. The cylinder housing 20 having a pair of oppositely disposed mounting lugs 20A and 20B with a bearing housing 44 and associated bushing 45 as will be well known and understood by those skilled in the art.

In operation, the piston and cylinder guard 27 will advance outwardly along its guide channels 37 and 38 over the exposed piston rod 21 as the movable shear blade 16 is closed as seen in solid lines in FIGS. 1 and 2 of the drawings with the piston and cylinder guard 27 supported on its rod engagement portion 33 by the pivot pin 22 through the shear blade 16 and on its oppositely disposed guide portion 32 by the movable shoes 41 within the transversely spaced parallel guide channels 37 and 38 secured to the cylinder housing 20. The above referred to arrangement defines a strong impact resistant movable cover sleeve for the exposed piston rod 21 without interfering with or restricting the piston and cylinder assemblies 18 action in any way.

When the shear blade 16 is in open position as seen in broken lines in FIG. 2, the piston and cylinder guard 27 is positioned along its guide channels 37 and 38 over the hydraulic cylinder 20A as seen in broken lines in FIGS. 1 and 2 of the drawings. It will thus be seen that a new and novel piston rod cylinder guard has been illustrated and described and it will be apparent to those skilled in the art that changes may be made therein without departing from the spirit of the invention, therefore

I claim:

1. A cylinder and piston rod guard for use on a hydraulic piston and cylinder, the piston rod is movable such that a portion of the piston rod extends outwardly from said cylinder, said cylinder guard having a rod engagement portion and a guide portion, a sleeve partially surrounding the piston rod along its extended length, said rod engagement portion being connected to the piston rod so as to move therewith, said guide portion movably positioned on said cylinder so as to move thereon in accordance with the axial advancement of said piston rod from said cylinder, a pair of guide channels secured to said cylinder, movable guide shoes extending from said guide portion of said cylinder guard, said guide shoes registerable within said respective guide channels, means for supporting said guide shoes on said cylinder guard and means for interconnecting said rod engagement portions of said cylinder guard to the piston rod.

2. The cylinder and piston rod guard for use on a hydraulic piston and cylinder of claim 1 wherein said sleeve is bifurcated and tapered along its longitudinal axis.

3. The cylinder guard of claim 2 wherein said taper on said sleeve is between said rod engagement portion and said guide portion.

4. The cylinder and piston rod guard for use on a hydraulic piston and cylinder of claim 1 wherein said guide channels are spaced in relation to said cylinder and in parallel spaced relation to one another.

5. The cylinder and piston rod guard for use on a hydraulic piston and cylinder of claim 1 wherein said guide channels are secured to a cylinder housing of said cylinder by mounting brackets that conform to the radial peripheral surface of said cylinder housing, said mounting brackets are in longitudinal spaced relation to said cylinder on said cylinder housing.

6. The cylinder and piston rod guard for use on a hydraulic piston rod and cylinder of claim 1 wherein said means for supporting said guide shoes on said sleeve comprises aligned apertured reinforcing plates on said sleeve guide portion, multiple threaded bolts extending through said reinforced plates and said guide portion.

7. The cylinder and piston rod guard for use on a hydraulic piston and cylinder of claim 1 wherein said means for interconnecting said cylinder and piston rod guard to said piston rod comprises mounting bushings on said rod engagement portion and a pivot pin extending through said piston rod and mounting bushings.

* * * * *